Jan. 28, 1930.                    J. N. NELSON                        1,745,227
                               OPHTHALMIC MOUNTING
                                 Filed July 9, 1928
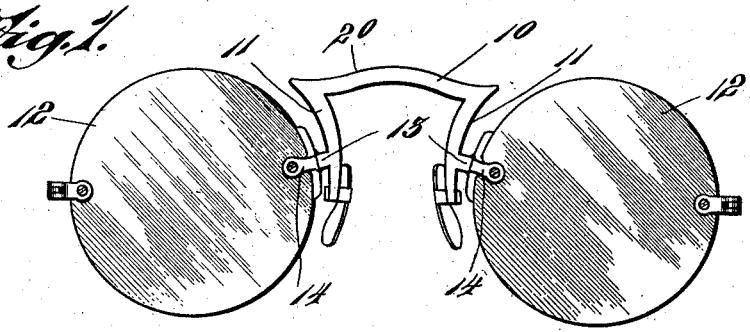
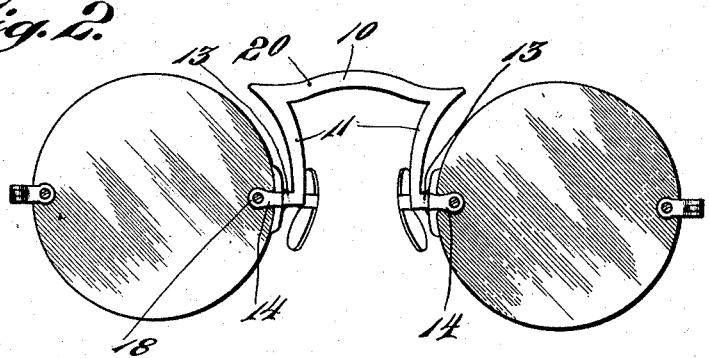
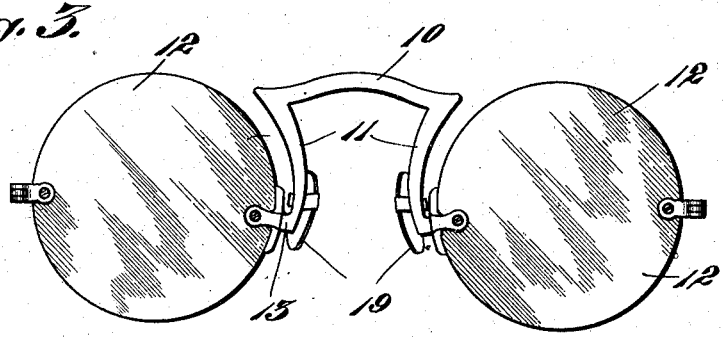
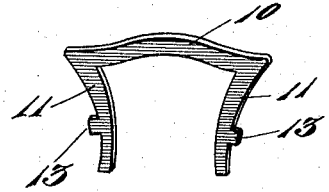
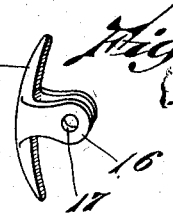
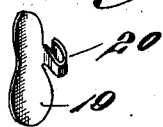
INVENTOR.
John N. Nelson.
BY Barlow & Barlow
ATTORNEYS.

Patented Jan. 28, 1930

1,745,227

UNITED STATES PATENT OFFICE

JOHN N. NELSON, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND

OPHTHALMIC MOUNTING

Application filed July 9, 1928. Serial No. 291,152.

This invention relates to an improved construction of ophthalmic mounting; and has for its object to provide in such a mounting a bridge member of substantially U-shape comprising a cross-bar having downwardly-extending side arms, each having a laterally-extending lens clamp secured thereto adjacent its lower end and also having a bendable noseguard carrying arm.

With these and other objects in view, the invention consists of certain novel features of construction, as will be more fully described, and particularly pointed out in the appended claims.

In the accompanying drawings:

Fig. 1 is a front view of my improved mounting showing the lens clamps as connected to the side arms of the bridge at a point above the medial line thru the lenses.

Fig. 2 shows the lens clamps as connected to the side arms of the bridge on the medial line thru the lenses.

Fig. 3 shows the lens clamps as connected to the hide arms of the bridge at a point below the medial line of the lenses.

Fig. 4 shows the bridge member with the other members disconnected therefrom.

Fig. 5 is a perspective view of one of the lens clamps detached from the bridge.

Fig. 6 is a perspective view of the noseguard detached from the bridge.

It is found in practice of advantage in the construction of ophthalmic mountings in which the lenses have no rims or eyewires to provide a bridge member of substantially U-shape having downwardly-extending side arms with laterally-extending bosses adjacent their lower ends to which lens clamps may be soldered and to also provide noseguard members having bendable arms connected to these side arms of the bridge, such mountings being preferably provided with temples by which they are retained in position on the face of the wearer; and the following is a detailed description of the present embodiment of my invention and showing one means by which these advantageous results may be accomplished:—

With reference to the drawings, 10 designates the bridge member which is preferably in somewhat of an inverted U-shape having side arms 11 extending downwardly to a point adjacent the medial line thru the lenses 12, the bridge member being flat and preferably stamped out of flat sheet material. These arms are preferably curved inwardly to follow somewhat the contour of the adjacent peripheries of the lenses and these side arms are provided with laterally-extending bosses 13 which may be positioned, in some cases, above the medial line thru the lenses, as illustrated in Fig. 1, on the medial line, as illustrated in Fig. 2, or slightly below the medial line, as illustrated in Fig. 3, to suit different requirements.

To these bosses are soldered or otherwise secured the lens clamps 14 each of which comprises a saddle portion 15 the back of which is secured by solder or otherwise to the boss 13 on the bridge arm and a pair of spaced ears 16 which straddle the lenses 12, the ears being pierced as at 17 and one being threaded to receive a binding screw 18 which extends thru the lens and by which the clamp ears are firmly pressed against opposite sides of the lens to grip the same between them.

By the use of my improved construction of bridge member, I provide a pair of noseguard members 19, each having a bendable arm 20, the end of which is secured by solder or otherwise to the side arms 11 of the bridge member preferably at a point adjacent the medial line thru the lenses, whereby these connecting arms may be bent so as to adjust the noseguard plates to properly engage the sides of the nose of the wearer to support the mountings thereon.

In this special style of bridge member, the side arms 11 are preferably of a length about one-half the diameter of the lenses so as to support the cross bar 20 about even with the upper edges of the lenses 12 between which it sets. In this way, by this construction the side arms are capable of being bent toward or from each other to assist in fitting the mounting to the widely varying faces of different wearers.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, an inverted substantially U-shaped bridge member consisting of a flat sheet material stamping and having side arms, a laterally extending lens clamp secured to each of said arms adjacent the end thereof, and a bendable noseguard carrying arm rigidly secured to the rear of each bridge arm.

2. In an ophthalmic mounting, an inverted substantially U-shaped bridge member consisting of a flat sheet material stamping and having side arms, a laterally-extending boss on each arm adjacent its end, a lens clamp attached to each of said bosses and in the plane of said bosses for embracing the lens, and a bendable noseguard carrying arm attached to the rear of each of said bosses.

3. In an ophthalmic mounting, an inverted substantially U-shaped bridge member consisting of a flat sheet material stamping and having elongated inwardly-curved side arms, each having a laterally-extending spacer boss adjacent its lower end, a lens clamp connected to each boss and in the plane of the boss, and a bendable rearwardly-extending noseguard carrying arm connected to the rear of each of said arms adjacent their lower ends.

4. In an ophthalmic mounting, an inverted substantially U-shaped bridge member consisting of a flat sheet material stamping and having side arms of a length substantially one-half the diameter of the lenses to which they are attached, said arms being inwardly curved to substantially conform to the contour of the inner edges of the lenses, a laterally extending spacer boss on the outer edge of each arm adjacent its lower end, a lens clamp attached to each boss and in the plane of the boss to support the lenses spaced from the bridge arms, and a bendable rearwardly-extending noseguard carrying arm attached to the rear of each of said side arms adjacent their lower ends.

In testimony whereof I affix my signature.

JOHN N. NELSON